SYNCHRONIZING CHARACTER GENERATORS

Filed April 6, 1959 9 Sheets-Sheet 1

INVENTOR
CARL J. ZARCONE
BY Richard G Stahr
ATTORNEY

Feb. 6, 1962 C. J. ZARCONE 3,020,337

SYNCHRONIZING CHARACTER GENERATORS

Filed April 6, 1959 9 Sheets-Sheet 6

Feb. 6, 1962 C. J. ZARCONE 3,020,337

SYNCHRONIZING CHARACTER GENERATORS

Filed April 6, 1959 9 Sheets-Sheet 8

3,020,337
Patented Feb. 6, 1962

3,020,337

SYNCHRONIZING CHARACTER GENERATORS

Carl J. Zarcone, Rochester, N.Y., assignor to General Dynamics Corporation, Rochester, N.Y., a corporation of Delaware Filed Apr. 6, 1959, Ser. No. 804,377
8 Claims. (Cl. 178—2)

This invention relates to signaling systems and particularly to the automatic production and transmission of codes in a signaling system where items of information are represented each by a train of serially related pulses.

The object of the invention is to provide means in a time division multiplex telegraph system for producing within the period allotted to a given channel a code representing a condition encountered other than a character code awaiting transmission. By way of example, a common occurrence is the absence of a code in a channel register. In the multiplexing arrangement, the movement of the codes is synchronous but in the printing telegraph channels which feed the registers used as a source for the multiplexing arrangement this operation is not necessarily synchronous and hence in the time interval allotted to any given channel the register may well be found empty. Since the system requires a constant stream of synchronously transmitted signals for the purpose of maintaining synchronism at the distant end, a "no character" code is synthesized and transmitted rather than allowing the interval to pass without the transmission of any signals, and this synthesized code is one, which, differing from any code regularly used is best fitted for the purpose of maintaining synchronism.

The present invention is embodied in a system whose operation is primarily based on the use of a precision emitter of what are known as clock pulses. Employing such a source of pulses there is provided electronic logical circuitry by which the constantly transmitted codes of a large number of printing telegraph channels may be multiplexed and transmitted over a single broad band circuit such as a telephone channel. Such circuitry is employed to count off the number of pulses in each code and the number of channels of telegraph transmission being multiplexed, it being understood that the said number of channels times the number of pulses in each said channel must be fitted into the telegraph transmission time for one code. Thus, by way of example, where a conventional printing telegraph device operates at the rate of one hundred words per minute, which is considered to be the equivalent of transmitting each letter in one tenth of a second, and where on the average each word contains six letters, it is plain that the telegraph transmission time is one hundred milliseconds per character, which means that the cycle during which a given number of characters from a given number of channels is transmitted must be repeated ten times per second. Assuming that each character contains 6 code bit places and that fifty channels are to be multiplexed, then such code bits must be sent at the rate of 300 each one-tenth of a second, or at a rate of 3000 per second. Hence a generator of 3000 clock pulses per second must be employed. This may be in the form of a conventional free running multivibrator.

It will be understood that the present invention is not limited to these figures but may be constructed and arranged to accommodate a larger or a smaller number of multiplexed channels, as for example the multiplexing of 100 channels by the use of a clock pulse free running multivibrator emitting six thousand pulses per second, this being an engineering problem depending on the number of channels which it may be desired to serve.

A feature of the invention is a stand-by circuit which will test each and every code transmitted over the main transmission line and which will respond to the first of the six bits thereof to retire and to not interfere with the transmission of the following five bits thereof if such first bits is of the nature of a legitimate code but which otherwise will immediately synthesize and transmit an alternative following five bits.

In accordance with this feature the conventional space start signal of every legitimate telegraph code is inverted to a mark signal and is picked off the register as a binary one bit for transmission over the multiplex channel as a positive pulse. Thus when a given channel is alerted by the channel signal, a positive signal lasting for six clock counts, there will be transmitted a series of six shift pulses which will thereupon move the registered bits forward whereby they will be transmitted in seriatim from the said register into the circuitry of the multiplex channel. If the register is empty the first such bit to emerge therefrom will be a binary 0 whereupon this stand-by circuit will synthesize five binary one bits to be transmitted over the multiplex channel in place of the following five bits emerging from the said register. If through some random error one or more of the following five bits emerging from the said register prove to be binary one bits, they will be blanked by the binary one bit synthesized by this stand-by circuit so that this "No Character" character will nevertheless be transmitted.

If, on the other hand, the first bit emerging from the register is a binary one bit, this stand-by circuit will respond thereto and become deactivated so that this proved legitimate code may be transmitted bit by bit as it emerges from the said register.

Also, in accordance with this feature, this stand-by circuit contains an inhibiting means to prevent its operation when some special code synthesized by a circuit, alerted by a channel signal other than one used to associate a telegraph register with the multiplex transmission channel, produces a first binary zero bit. Thus, by way of example, one of the channel signals may be given over to the transmission of a synchronizing signal which will be headed by a binary zero bit and hence to prevent the above described stand-by circuit from synthesizing the "No Character" code and transmitting it over the multiplex channel, the inhibitor in this stand-by circuit is made to respond to the channel signal used for the circuitry producing the said synchronizing signal.

It is apparent that other special synthesized signals, each headed by a binary zero bit and each employing one channel signal may be produced and transmitted without interference by the said stand-by circuit through the provision of a connection of the said inhibitor of the stand-by circuit to the circuitry of the special signal synthesizing means to render the said inhibitor responsive to the channel signal therefore.

Another feature of the present invention is a special signal synthesizing circuit for producing and transmitting a special signal headed by a binary zero bit and having means therein for transmitting its channel signal also to the said stand-by circuit inhibitor whereby such special signal may be produced and transmitted without interference by the stand-by circuit. Thus special signals, such as the Frame Synchronizing Signal having the special first bit which in general will allow the stand-by circuit to synthesize and transmit its "No Character" code, may be synthesized and transmitted without any interference by the said stand-by circuit.

Applicant has shown and described a single one of such special signals (001111), the Frame Synchronizing Signal, but states that the principle of his invention applies equally well to other special signals such as (001010) or (001101) which might be synthesized and transmitted for other purposes.

A feature of the invention is a means for deriving from a train of pulses a recurrent count of a given number and the transformation of the last counted pulse into a control signal, whereby, by way of example, each sixth pulse of a series may be derived from such a train. Such a means consists of a series of flip-flops arranged as a binary counter, one for each place of the binary code used to express the number to be counted. Thus, by way of example, three flip-flops may be used to express the $2^0$ place, the $2^1$ place and the $2^2$ place whereby the values 0, 1, 2, 3, 4, 5, 6 and 7 may be expressed in binary code. A feature of this invention is a means for resetting to zero those flip-flops, the sum of whose values express the number of counts to be subtracted from the total number of counts which such binary counter is capable of making. Thus the binary counter consisting of three flip-flops is capable of making eight ($2^3$) counts in each otherwise uncontrolled cycle. For the purpose of the present invention a count down counter is used, that is, one which having reached the binary value 000 will on its next operation go to the value 111 (equal to 7) and thereafter successively go to the values 6, 5, 4, 3, 2, 1 and 0. Therefore, if at the end of such a cycle, when all three flip-flops have been driven to an ON condition, which may be signalled by an AND circuit connected to the "1" output of each of the three flip-flops, the second one thereof which expresses the binary code second place (from the right) value is reset, the value jointly expressed by the three flip-flops will immediately be changed from seven (111) to five (101) and since the output of the AND circuit will thereupon be returned to zero, the counting will be continued from there on as a count down operation. Thus, as the expressed seven (111) value is changed at a point in between the incoming pulse which has driven the counter to this value and the next pulse which would ordinarily be 6 (110), the counter will be driven to express five (101) and so rearrange the relation of the three flip-flops that the succession of counts will thereafter express the values 4, 3, 2, 1 and 0 in succession whereupon the next following count will again attempt to express the value 7. Thus, in effect, the count down will be 5, 4, 3, 2, 1 and 0, that is, six counts.

In order to produce an output of six successive time intervals, let us say, applied to six separate channels, it will be necessary to have seven AND circuits each having three inputs connected to the 0 and 1 outputs of the three flip-flops in a configuration to express the binary value of the three flip-flops at any given time.

Since the flip-flops successively express two values 7 and 5 during the interval between successive incoming pulses at the beginning of the counting cycle, it will be necessary to use two AND circuits one to respond to the expressed value 7 and the other to respond to the expressed value 5, these two AND circuits having a common output constituting the means for enabling the first of said six channels. A single AND circuit will thereafter be used for each counting step to successively enable the next five channels on the counts 4 to 0 inclusive. The following table shows how the three flip-flops FA, FB and FC may be used for this purpose. By way of example, the AND circuit which responds to the binary value 4 and which is used to enable the second channel will have three inputs connected to the "0" outputs of flip-flops FA and FB and to the "1" output of the flip-flop FC.

| Expressed Binary Value | FC | FB | FA | AND circuit Ordinal Output |
|---|---|---|---|---|
| | Outputs connected to AND circuits | | | |
| 7 | 1 | 1 | 1 | 1 |
| 5 | 1 | 0 | 1 | 1 |
| 4 | 1 | 0 | 0 | 2 |
| 3 | 0 | 1 | 1 | 3 |
| 2 | 0 | 1 | 0 | 4 |
| 1 | 0 | 0 | 1 | 5 |
| 0 | 0 | 0 | 0 | 6 |

Since the values 7 and 5 are both expressed in the same interval, there are therefore six intervals during which six channels may be successively enabled by these AND circuit outputs.

This same arrangement may be equally well applied to a more extensive binary counter. Let it be assumed that there are to be 50 channels each successively enabled. Then it will be necessary to use a counter capable of counting at least to 50. This will be a counter having a flip-flop for expressing the values 0 and 1 in each of the binary places $2^0$, $2^1$, $2^2$, $2^3$, $2^4$ and $2^5$ so that when each place is filled with a 1 bit the value 1 1 1 1 1 1 or 63 will be expressed. Counting the zero (0 0 0 0 0 0) this renders the counter capable of expressing 64 or $2^6$ values. Since we only wish to count 50, we must subtract 14 and we therefore use the output of an AND circuit reporting coincidence of all six flip-flops to reset the 2nd, 3rd and 4th flip-flops which express the values $2^1$, $2^2$ and $2^3$ values (2, 4 and 8, making 14) so that the value 63 (1 1 1 1 1 1) is now changed to 49 (1 1 0 0 0 1) and it is this value from which the countdown starts. The count of 49 to and including 0 equals 50, so that by resetting the 2, 4 and 8 value flip-flops the desired count of fifty may be attained. In this arrangement the AND circuit matrix will contain 51 AND circuits each having 6 inputs one connected to either the 0 or 1 output of each of the said 6 flip-flops, so that 50 outputs are provided to successively enable 50 circuits. When the value 63 (1 1 1 1 1 1) has been attained, this will immediately be changed to 49 (1 1 0 0 0 1) and hence two AND circuits, one responsive to 63 and the other responsive to 49 will be used with a common output to enable the first channel selecting line. Thus counting down from 49 to and including 0 gives the desired result. This may be expressed in a table as follows:

| Value Expressed | F-6 | F-5 | F-4 | F-3 | F-2 | F-1 | AND circuit for channel |
|---|---|---|---|---|---|---|---|
| 63 | 1 | 1 | 1 | 1 | 1 | 1 | 1 |
| 49 | 1 | 1 | 0 | 0 | 0 | 1 | 1 |
| 48 | 1 | 1 | 0 | 0 | 0 | 0 | 2 |
| 47 | 1 | 0 | 1 | 1 | 1 | 1 | 3 |
| 46 | 1 | 0 | 1 | 1 | 1 | 0 | 4 |
| | | * | * | * | * | | |
| 1 | 0 | 0 | 0 | 0 | 0 | 1 | 49 |
| 0 | 0 | 0 | 0 | 0 | 0 | 0 | 50 |

Here, again, the first two values 63 and 49 occur within the first interval and hence the AND circuits being arranged to respond to these values will have a common output.

Other features will appear hereinafter.

The drawings consist of nine sheets having twenty-three figures, as follows.

Figure 22:
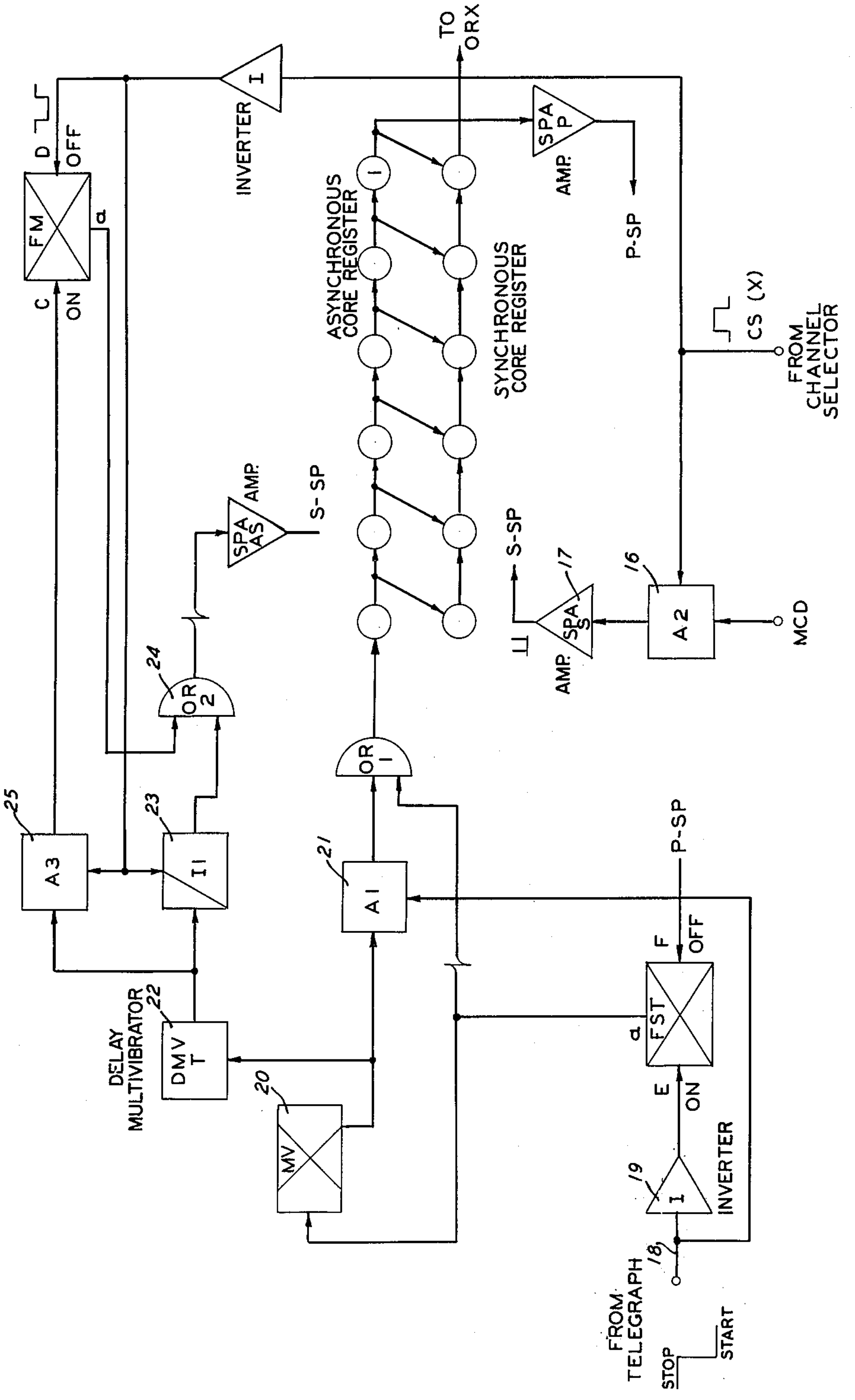
Figure 23:
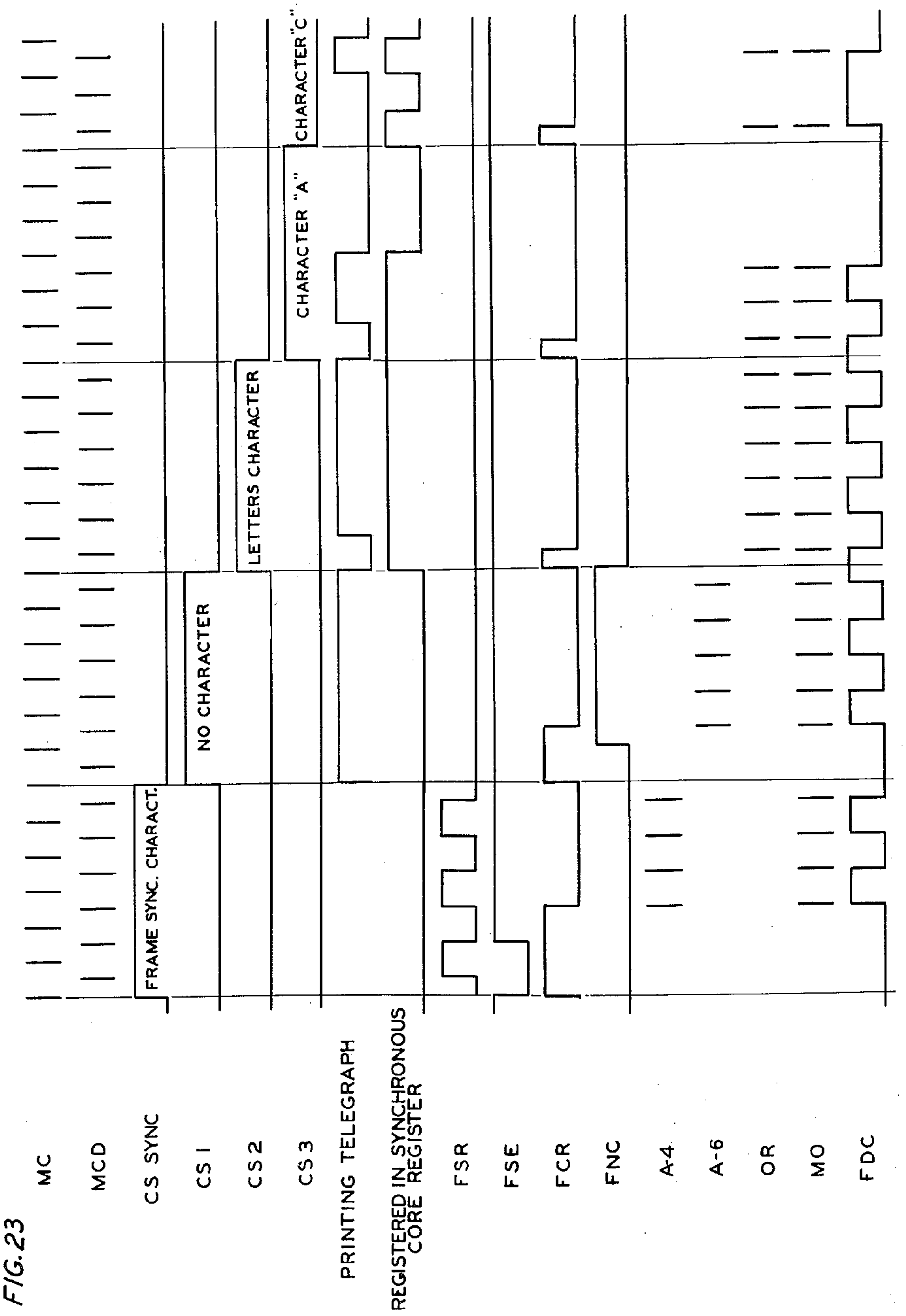

FIG. 22 is a schematic circuit diagram showing the operation of a transmitting channel by which the incoming telegraph code may be entered into the asynchronous register within a period of 100 milliseconds and thereupon transferred to the synchronous register from which it is picked off for transmission within some one or another 2 millisecond interval within the following 100 millisecond period while the next telegraph code is being registered; and FIG. 23 is a sequence chart showing how various characters both legitimate and synthetic are formed and transmitted over the multiplex circuit line.

Figure 1:
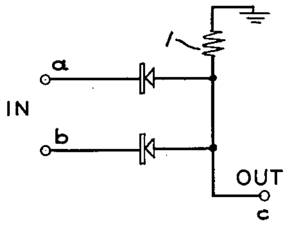
FIG. 1 is a fragmentary schematic circuit diagram of an AND circuit.

In the drawings FIG. 1 shows the circuitry of an AND circuit, a device having two or more inputs all of which must be UP or at a raised potential to move the output from DOWN to UP. The characteristic of an AND circuit is that the output is tied by a resistor to the high potential of the system. In the present case UP is at ground potential and DOWN is at some negative potential such as minus twelve volts. Each input includes a diode poled so that current may flow from ground through the resistor 1 to the circuit to which the input is connected and thus produce a potential drop over the resistor 1 whereby the output C will be DOWN. Until both input *a* and input *b* are driven UP, the output *c* may not move UP. Such an AND circuit may have a large number of inputs and it will always be necessary that all of them must be UP before an UP condition will be produced in the output.

Figure 2:
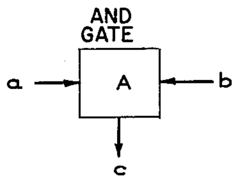
FIG. 2 and FIG. 3 are alternatively used symbols for an AND circuit.
Figure 3:
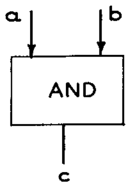

Generally an AND circuit is symbolized by a rectangle enclosing an A (FIG. 2) or enclosing the word AND (FIG. 3), with all the inputs ending in an arrowhead pointing to the rectangle.

Figure 4:
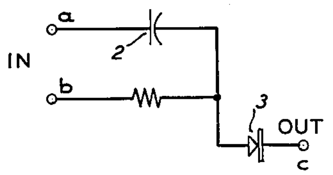
FIG. 4 is a fragmentary schematic circuit diagram of an AND circuit used as an alternating current gate.

FIG. 4 shows the circuitry for an alternating current AND gate in which the input *b* must be UP before an alternating current applied to the input *a* may pass through the condenser 2 and thence through the diode 3 to the output *c*. Such an AND circuit is also symbolized as FIG. 2 or FIG. 3.

Figure 5:
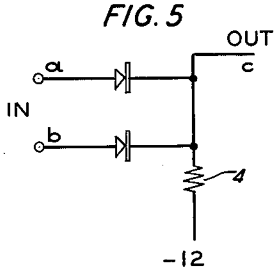
FIG. 5 is a fragmentary schematic circuit diagram of an OR circuit.

FIG. 5 shows the circuitry for an OR circuit which is characterized by a connection through a resistor 4 to the low potential of the system. As long as no one of the inputs connected through diodes poled to pass current from the input to the output is not UP the output will be DOWN, at a potential substantially at the low potential of the system. However, when the input *a* or the input *b*, or any one of a plurality of similar inputs are UP the output *c* will be UP.

Figure 6:
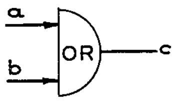
FIG. 6 is the symbol used to represent an OR circuit.

The OR circuit is symbolized as in FIG. 6 as a semicircular segment having all the inputs terminating in arrowheads pointing to the straight line diameter of this semicircular segment and an output leaving from the curved portion thereof, generally with the word OR inscribed therein.

Figure 7:
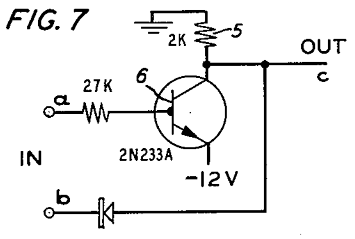
FIG. 7 is a fragmentary schematic circuit digram of an inhibitor, which functions as a normally open gate but which may be closed to the passage of pulses.
Figure 8:
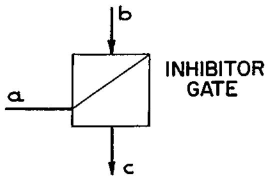
FIG. 8 is the symbol for an inhibitor.

FIG. 8 shows the symbol used for an inhibitor, a circuit element used as a normally open gate, the circuitry for which is shown in FIG. 7. This circuit element has in its input *a*, its load resistor 5 and its output *c* the aspects of an AND circuit and in the absence of an UP condition on the input *a* will pass an UP condition on input *b* to the output *c*. However, if it is desired to block the UP condition on the input *b* from reaching the output *c* an UP condition may be placed on the input *a* which will put the transistor 6 into condition so that any UP condition on input *b* will find a DOWN condition on the output *c* which cannot be overcome. Thus as long as the transistor 6 is in a conducting state no signal from the input *b* to the output *c* may be passed.

Figure 9:
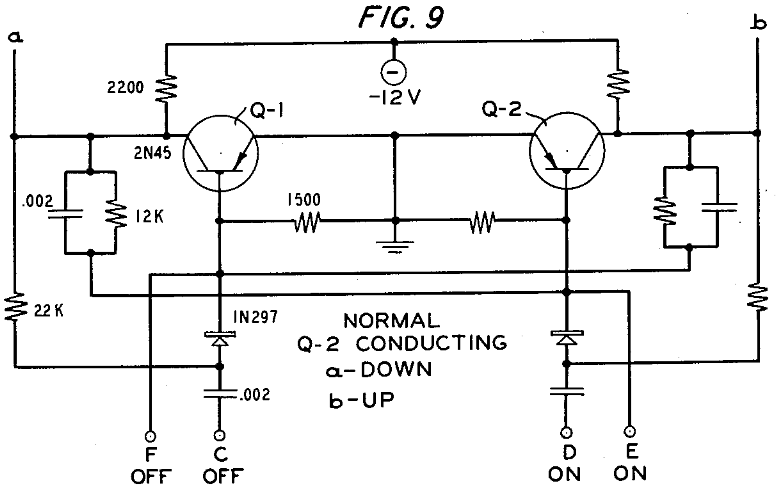
FIG. 9 is a schematic circuit diagram of a flip-flop having its various inputs and outputs lettered for quick recognition of the various operations thereof.

FIG. 9 shows the circuitry for a flip-flop which responds to positive input signals and transmits positive output signals. Such a flip-flop is essentially an ON and OFF device, a bistable electronic circuit which may at will be switched to either its ON condition or its OFF condition, or under given circumstances be switched alternately to its other condition.

The circuit consists of a pair of mutually controlling transistors Q–1 and Q–2 and has two input terminals C and D by which the device may be driven to an OFF condition or to an ON condition. The outputs *a* and *b* may be denoted the ON or OFF outputs respectively for when the flip-flop has been driven ON the output *a* is UP and correspondingly when the circuit has been driven OFF the output *b* is UP.

In its normal OFF condition the transistor Q–2 is conducting and therefore brings its collector to substantially the potential of its emitter, that is, UP, or substantially to ground potential. In this state a positive potential applied to the E input or a positive pulse applied to the D input will drive the transistor Q–1 to conduction and will relieve transistor Q–2.

Figure 10:
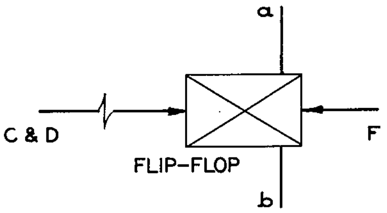
FIG. 10 is the symbol used for a flip-flop when its two inputs C and D are tied together so that the device will respond to a train of pulses by being alternately driven ON and OFF and showing the use of its input F for resetting the same to its OFF position if it has been left in an ON position.

The flip-flop is generally symbolized as a rectangle having two diagonal lines connecting the opposite corners. As shown in FIG. 10, an input coming into the left hand side of the rectangle by means of an alternate UP and DOWN potential, here marked C and D (meaning that the inputs C and D are tied together) is a step by step device and will respond to a train of pulses on its input C and D to step alternately ON and OFF, to drive its output *a* alternately ON and OFF and its output *b* alternately OFF and ON.

If the right hand input F is driven UP and the flip-flop is OFF there will be no change but if the flip-flop is ON it will be driven OFF.

Figure 11:
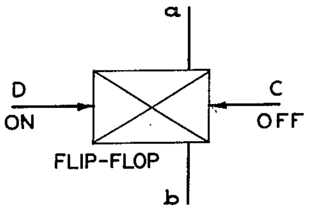
FIG. 11 is the symbol for a flip-flop which will respond separately to positive pulses to be driven to its ON or to its OFF position.

The flip-flop shown in FIG. 11 is a simple ON and OFF device which may be driven ON by the input D and OFF by the input C.

Figure 12:
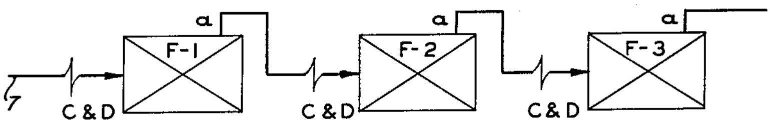
FIG. 12 is a schematic circuit diagram showing how three flip-flops may be connected as a countdown counter to count the number of pulses in a train supplied over the input of the chain.

A binary counter may be formed by connecting three (by way of example) flip-flops together as shown in FIG. 12, in which case the number of pulses incoming on the input 7 may be counted. This will be what is termed a count down counter, for if each of the flip-flops F–1, F–2 and F–3 represents a 1 bit when it is ON and F–1 represents the $2^0$ place, F–2 represents the $2^1$ place and F–3 represents the $2^2$ place, then the combination where all three are OFF will represent 000, or the value 0. Thereupon the first incoming pulse on the input 7 will drive the counter to 111 or the value 7, since such incoming pulse drives the flip-flop F–1 ON and its output *a* drives the flip-flop F–2 ON and this in turn drives the flip-flop F–3 ON. The advancing values represented by the ON and OFF states of these flip-flops are indicated by the graphs of the timing chart of FIG. 13, where the UP condition in each graph represents the value 1, 2 or 4 respectively and the DOWN condition represents 0 in each case. Thus by summing the UP conditions, the value represented in each step may be quickly determined as indicated.

Figure 13:
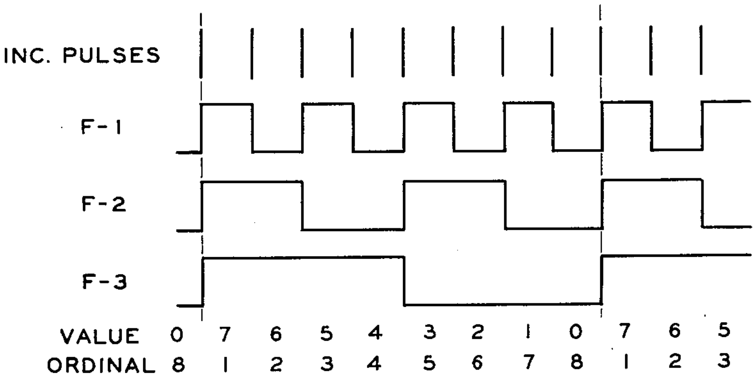
FIG. 13 is a sequence chart showing the operation of a chain of three flip-flops as in FIG. 12.

The value of the steps may be arbitrarily assigned as the ordinal values, also indicated in FIG. 13, the values of the steps being purely a matter of choice. However, with the count down values, where there may be a large number of flip-flops in a counting chain, the identification of a particular step may always be made by summing the UP values of the flip-flops at any given stage.

Figures 14, 15:
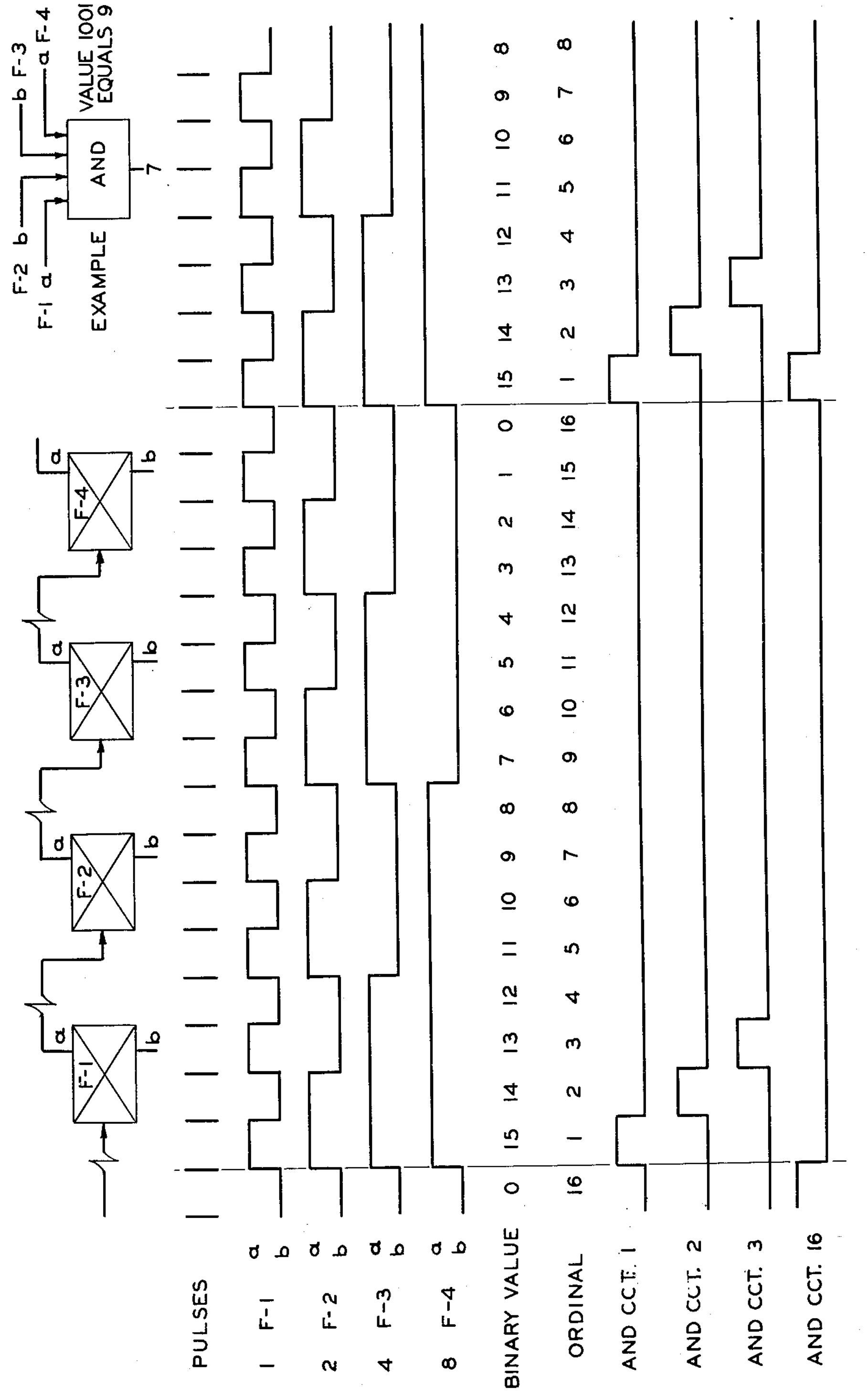
FIG. 14 is a sequence chart showing the operation of a chain of four flip-flops and indicating how 16 AND circuits may be connected to the various outputs thereof to produce 16 output signals.
FIG. 15 is an example of how one AND circuit may be connected to the *a* outputs of F–1 and F–4 and the *b* outputs of F–2 and F–3 to operate on the seventh (ordinal) step of the counter when the ON values of its input amount to 9 (the count down value)

FIG. 14 shows this same arrangement for a four flip-flop chain and FIG. 15 gives one example of the manner in which the sixteen AND circuits are connected, there being either an *a* or *b* input from each of the four flip-flops to each of the output AND circuits. In FIG. 15 the four inputs to the AND circuit having the ordinal output 7 are the F–1, *a*, the F–2, *b*, the F–3, *b* and the F–4, *a*, which may be written as 1001, the binary value number 9.

Figure 16:
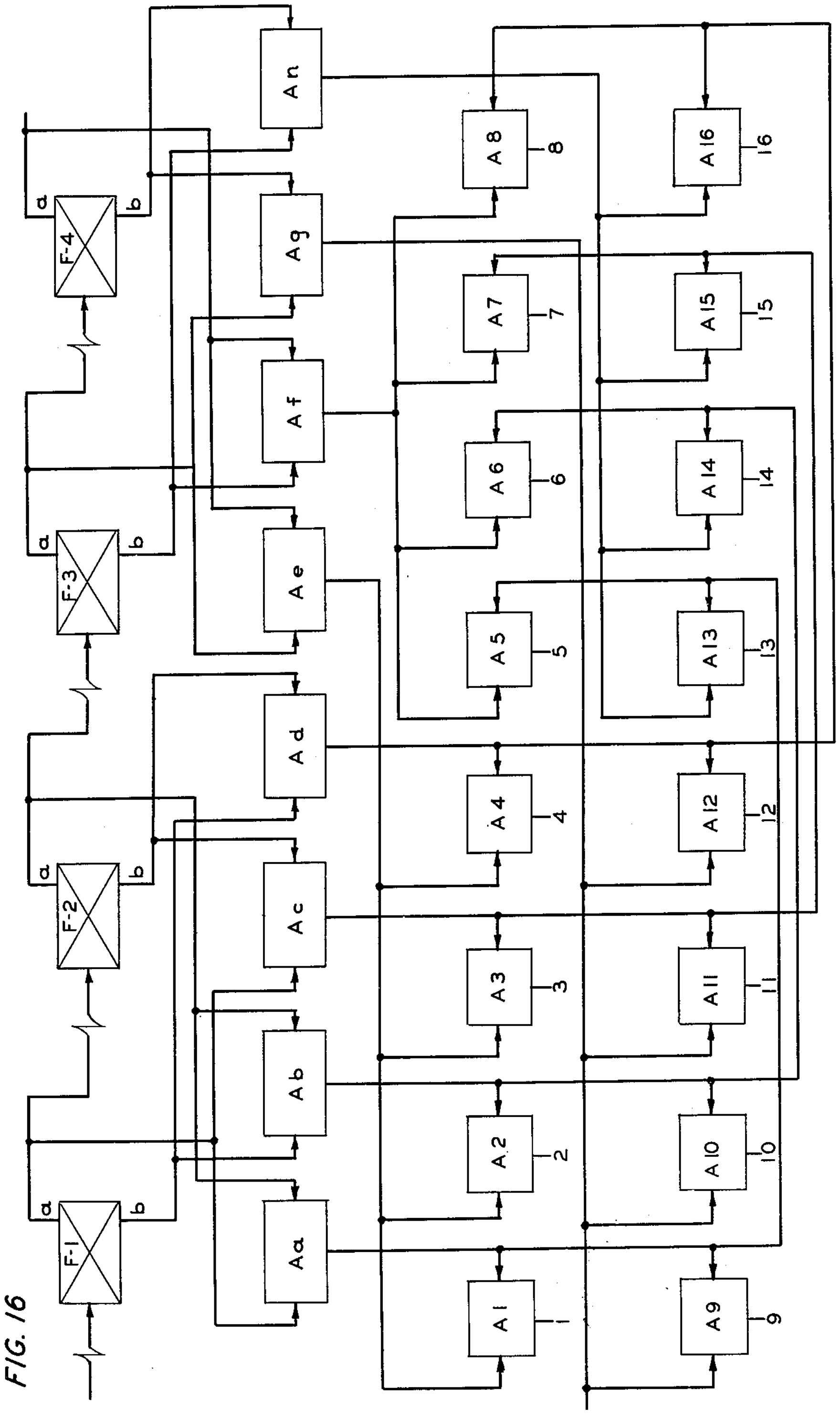
FIG. 16 show an alternative arrangement, employing a larger number of AND circuits but each of a simpler nature to provide an AND gate matrix.

As an alternative arrangement, an output matrix may be constructed and arranged as shown in FIG. 16, where the *a* and *b* outputs of the four flip-flops are combined in a larger number of AND circuits but each of a simpler nature, each having but two inputs.

Binary counting chains such as those just described are employed herein as components of the present invention, one to make a recurrent count of six and another to make a recurrent count of fifty, it being understood that these figures are by way of example only. This introduces another complication into the counting chain, a means for confining the count to the number desired rather than the full capability of the chain. Thus the first binary chain herein is to be used to make a recurrent count of six, to count the code places in an incoming printing telegraph code. A counting chain of three flip-flops may be used for this purpose since this will count $2^3$ or 8. To adapt this chain to count 6 instead of 8 it is necessary to subtract 2 and this may be done immediately that the count has advanced as indicated in FIG. 13 from 0 to 7 so that effectively the chain counts 0, 5, 4, 3, 2, 1 recurrently. This subtraction is made by using an AND circuit responsive to the value 7, that is, having three inputs one from each of the *a* outputs of the three flip-flops employed and using the output of this AND circuit for resetting that flip-flop having the binary value $2^1$ so that as the count advances from 0 to 7 (111) it will immediately be reset to 5 (101).

In like manner, a chain used to count 50 requires at least six flip-flops since $2^6$ equals 64, thus providing flip-flops having the binary values $2^0$, $2^1$, $2^2$, $2^3$, $2^4$, and $2^5$. Since the highest count which such a chain can make has a value 63, a subtraction of 14 must be made and this may be done by resetting the flip-flops $2^1$, $2^2$ and $2^3$, that is those representing the values 2+4+8=14. Hence as the count advances from 0 to 63, an AND circuit having six inputs from the *a* output of each of the six flip-flops will act to reset the second, third and fourth in the chain and thus immediately change the count from 63 (111111) to 49 (110001).

It will appear hereinafter that in accordance with the present invention two such counting chains are used in cascade, that is, a first chain of three flip-flops to count six clock pulses and to thus produce an A–1 signal each sixth clock pulse. Thereafter the interval between two successive A–1 pulses constitutes a channel time signal and fifty of these are recurrently counted so that fifty channels may be successively enabled, each for a period of six clock pulses.

It will further be noted that where a binary chain counter is employed for successively enabling a given number of channels, fifty by way of example, that the pulse responsive to the AND circuit employed as above described, as the count advances from 000000 to 111111 should be adjusted to change the registration from 111111 to 110001 just at the end of that six count period so that the output of the AND circuit 111111 may be a full period in length. An alternative arrangement and one not so critical in timing is to use two AND circuits having their outputs in parallel and both controlling the ordinal one channel time signal, one responding to the binary value 111111 signal and the other responding to the binary value 110001 signal whereby this signal will be full and complete.

By way of example, clock pulses may be provided by a generator of 3000 cycles per second whereby 50 channel signals each of 6 clock pulses or 2 milliseconds may be provided, whereby the traffic handled by 49 printing telegraph channels (one channel being reserved for synchronizing purposes) may be multiplexed.

It will appear hereinafter that each printing telegraph character code invariably starts with a mark pulse (the usual start pulse being inverted) so that where a space pulse is found during the first of the six counts of a channel time signal a special code must be synthesized and transmitted. These consist of the Frame Synchronizing Character, transmitted once each time the complete count of fifty is made and used for synchronizing, the "No Character" code synthesized and transmitted if the channel register is found to be empty and the Letters Character which will appear at first to be something other than a character code.

Figure 17:
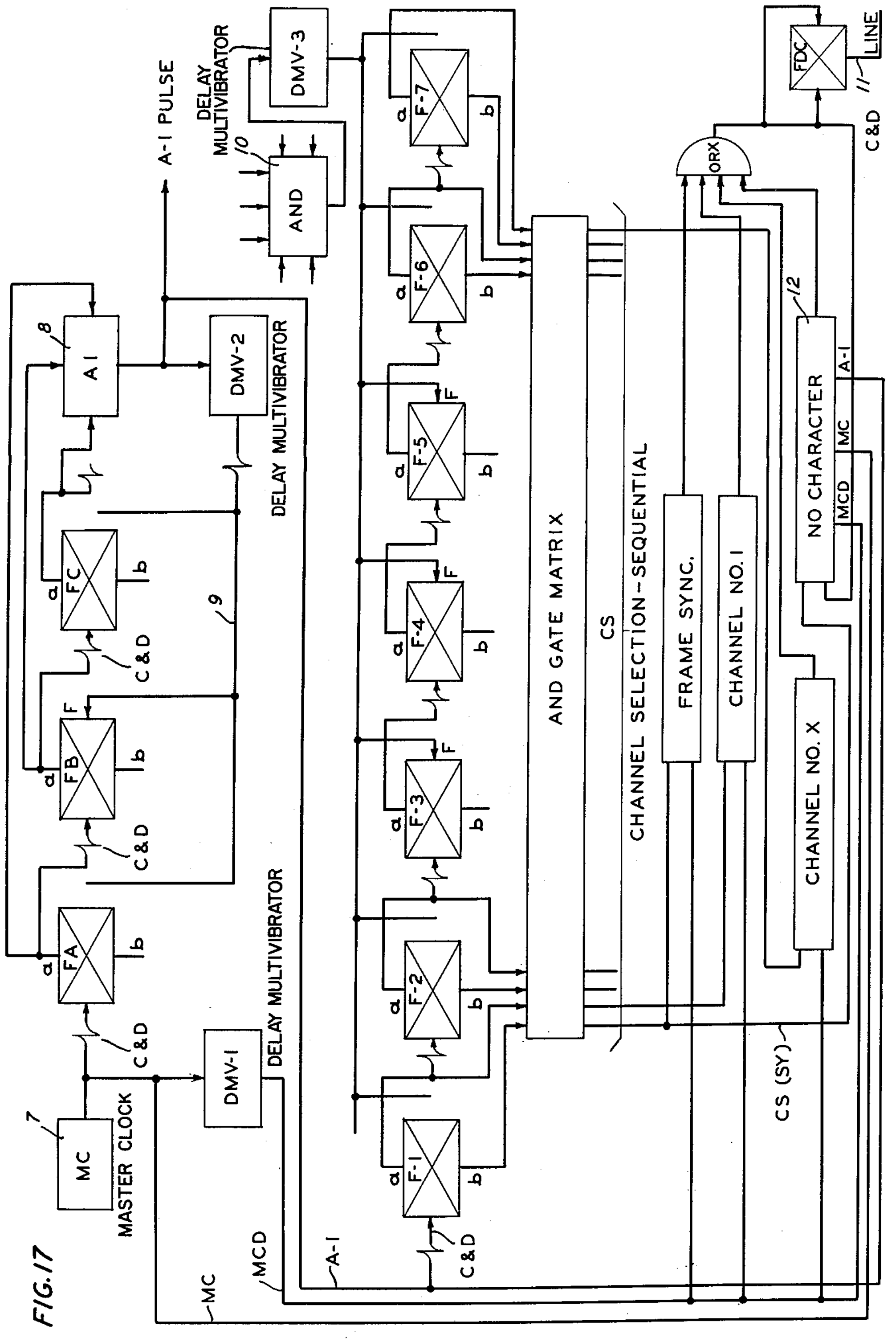
FIG. 17 is a block diagram having some indication of circuitry to explain the operation of the novel elements of the present invention.

For a complete understanding of the system, reference may be had to FIG. 17 which consists of certain details of the counting means and a block diagram showing the location within the system of component circuits.

The system is based on the use of a Master Clock (MC)7 which supplies a continuous train of pulses. As it has been suggested hereinbefore, this system may be controlled by a Master Clock supplying 3000 mc. pulses per second and thereby providing for fifty channel selection CS signals occurring within 100 milliseconds, the conventional timing of a printing telegraph code. Alternatively this Master Clock may be arranged to deliver 6000 mc. pulses per second and thereby provide for 100 channel selections within the same printing telegraph code time. The number of channel selection signals is a matter of choice and this larger figure is suggested herein by the showing of seven flip-flops in the second chain, capable of producing $2^7$ or 128 sequential pulses, but which may be reduced to an even hundred by subtracting 28 (16+8+4) as the counting advances from zero (0000000) to 127 (1111111) so as to immediately adjust the chain value from 127 (1111111) to 99 (1100011).

The Master Clock pulses are fed into a conventional delay multivibrator which is adjusted to produce an outgoing pulse at substantially the midpoint between each pair of MC pulses, these MCD pulses being used for certain control purposes which will appear hereinafter.

The MC pulses are fed into the first counter consisting of the three flip-flops FA, FB and FC, each of which has its C and D input terminals connected together so that the first responds to the incoming MC pulses by moving alternately ON and OFF. The *a* output of this FA flip-flop becomes the input for the FB flip-flop and so on so that it will be at once apparent that where all three are simultaneously OFF the first MC pulse will turn all three simultaneously ON and that thereafter the chain will be counted down as hereinbefore described. It has also been stated hereinbefore that it is intended to limit the counting of this chain to 6 instead of its full capability of 8. Thus the A1 AND circuit 8 is provided, having an input from each of the *a* outputs of the three flip-flops FA, FB and FC, whereby as the count of this chain advances from 000 to 111 the AND circuit 8 will produce an A1 pulse output. This, besides providing a train of A1 pulses for purposes which will hereinafter appear, will also operate the delay multivibrator DMV–2 whereby a pulse will be transmitted over its output 9 at any desired point between the MC pulse which produced the simultaneous operation of the three flip-flops and the next following MC pulse. The timing of this conventional DMV is subject to close adjustment so that its output may be adjusted to come halfway between two MC pulses or, alternatively, substantially with the said following MC pulse whereby the duration of the A–1 pulse may be half the interval between two MC pulses or substantially the same as such an interval.

However, and regardless of the actual delay of the output of DMV–2, the pulse on the line 9 may be fed to the F terminal of the desired flip-flops to adjust the operated configuration of the chain from its full capability to the desired value, in this case from 7 (111) to 5 (101). Hence the conductor 9 is connected to the F (OFF) terminal of the FB flip-flop.

In like manner the seven flip-flops F–1 to F–7 inclusive are used to provide a chain responding to the A–1 pulse and to count, by way of example, 100 cs. signals. This chain will have an AND circuit 10 having seven inputs, one connected to the *a* output of each of the flip-flops A–1 to A–7 inclusive. This AND circuit operates a delay multivibrator DMV–3 which performs a like function to the DMV–2. Thus as the count of this second chain advances from 0000000 to 1111111 the operation of the AND circuit 10 and then the DMV–3 causes the release or resetting of the flip-flops F–3, F–4 and F–5 to change the expressed value from 1111111 (127) to 1100011 (99).

Thus the timing means consisting of two binary counting chains in cascade will supply (1) a train of clock pulses MC, (2) a train of delayed clock pulses MCD, (3) an A–1 pulse at every sixth MC pulse and (4) X number of cs. signals sequentially, each one A–1 pulse apart. Since one cs. signal time is used for synchronizing, X–1 telegraph channels may be multiplexed.

It will appear hereinafter that a telegraph code sequentially taken from a storage register of each telegraph channel will be transmitted over the line 11. For purposes of the present invention the first space signal (the start signal of the telegraph code) is invariably inverted and appearing as a mark (or binary 1) signal acts as a signal that what follows is a legitimate code.

The principal object of the present invention is to synthesize special signals to be transmitted over the line 11 when the first of the six counted clock pulses fails to appear as a mark or binary 1 signal. Since the telegraph "Letters" character consists of a space (the start pulse) followed by five marks and since the start pulse as hereinabove stated is invariably inverted, it will be picked off the channel register and transmitted over the line 11 as six binary 1 signals (111111) and since it starts with a binary 1, it is a legitimate code.

When the channel register is empty, that is when there is no character registered therein, a No Character circuit 12 is provided to respond to the first binary 0 signal picked up from a channel register and transmitted over the line 11 and to thereupon supply a binary 1 for each of the following five counts so that where a channel register cannot supply a character, this special circuit operates and causes the transmission of the code 011111. This will be fully explained hereinafter.

Another code which is synthesized is that known as the Frame Synchronizing Character, used for synchronizing purposes once each recurrent operation of the Channel Selection operation. Since this will also start with a binary 0, means is provided to inhibit the No Character circuit from synthesizing and transmitting the code 011111. This is accomplished by placing an inhibitor in the No Character circuit and causing its operation by the cs. (synchronizing) signal. Thereupon the Frame Synchronizing circuit synthesizes and transmits the code 001111.

*The frame synchronizing channel circuit*

Figure 18:
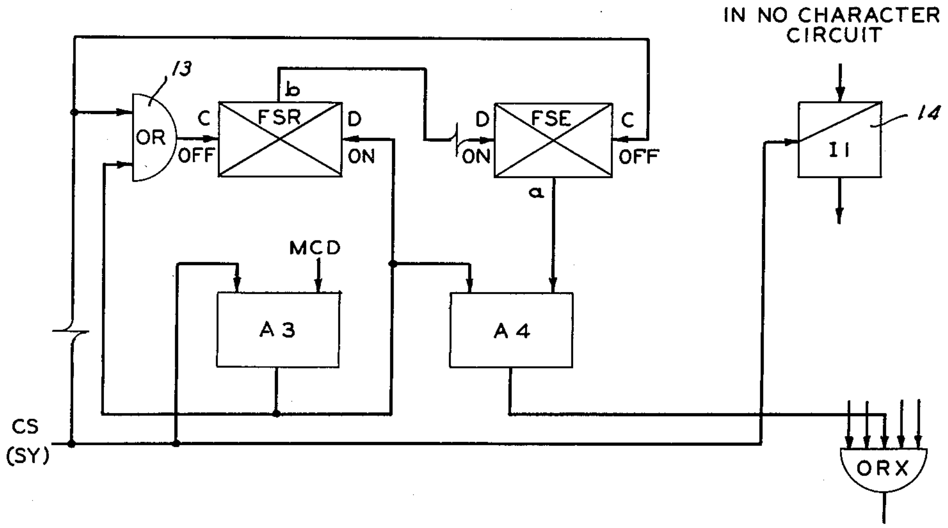
FIG. 18 is a schematic circuit diagram of the Frame Synchronizing Circuit by means of which a synchronizing code is synthesized and transmitted within one channel selection period.
Figure 19:
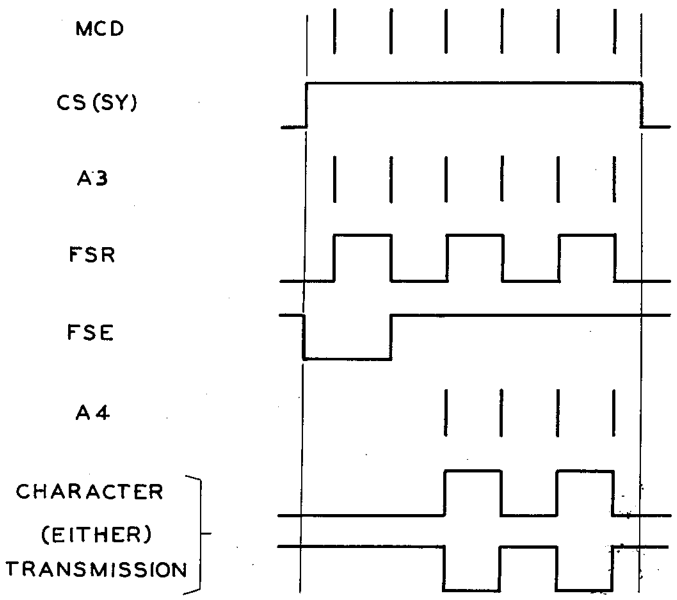
FIG. 19 is a sequence chart by which the operation of the circuit of FIG. 18 may be explained.

The operation of the circuit, FIG. 18, may be described as follows with the help of the sequence chart FIG. 19.

The cs. (synchronizing) signal consists of a two millisecond application of a positive potential to the cs. (synchronizing) conductor. The leading edge of this positive potential signal constitutes a positive triggering spike applied through the OR circuit 13 to the reset input of the FSR flip-flop and directly to the reset input of the FSE flip-flop. The FSR flip-flop is in its OFF condition and hence this triggering spike has no effect. The FSE flip-flop, however, has been left after the previous operation of this circuit in its ON condition, and hence this triggering spike operates to reset FSE to its OFF condition.

The positive cs. potential is applied to one input of the A–3 AND circuit and since the other input of this AND circuit is connected to the MCD source of delayed clock pulses, such MCD pulses will now be gated to the triggering circuit of the FSR flip-flop consisting of both the ON and the OFF inputs of the FSR flip-flop (the OFF input being reached through the OR circuit 13) and also to an input to the AND circuit A–4. Thus as long as the AND circuit A–3 is held enabled by the cs. potential, the FSR flip-flop will operate alternately ON and OFF in response to the MCD pulses, and the AND circuit A–4 will be enabled by each such MCD pulse. The cs. potential will be applied for two milliseconds whereby six MCD pulses will be passed.

Upon the occurrence of the first of these six MCD pulses, the FSR flip-flop will be triggered ON, but this will not affect the FSE flip-flop as the output from FSR is one which will pass a triggering pulse over its *b* output on the reset thereof. Hence it is not until the passage of the second MCD pulse through the A–3 gate, when the FSR flip-flop is triggered OFF that the FSE flip-flop will be triggered ON. Since no further triggering pulses will be passed from the CS connection during this cycle, the FSE flip-flop will remain ON thereafter even though at least two more triggering ON spikes will be passed to the triggering ON input of FSE on two following reset operations of FSR.

Now since the AND circuit A–4 is therefore enabled during the passage of the third, fourth, fifth and sixth MCD spikes by the AND circuit A–3, the operation of this circuit will produce synthetically a six place code 001111 for transmission over the line 11. This constitutes the Frame Synchronizing Character which will have an effect at the distance end of the transmission line to be more fully explained hereinafter.

It may be explained here, for the sake of clarity, that each bit, transmitted from this Frame Synchronizing channel circuit, or from another channel, will result in a change in the current transmission or a transition from a binary 0 to a binary 1 state, the direction of the transition being immaterial. Thus the transmission of the character 001111 is indicated in the sequence chart FIG. 19 by two opposite and equal graphs, both of which have the same effect at the distant end.

Figure 20:
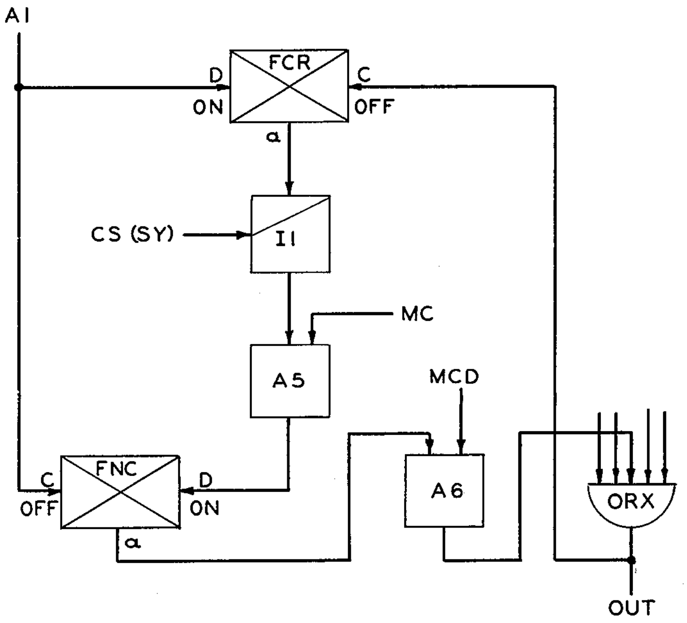
FIG. 20 is a schematic circuit diagram showing the "No Character" synthesizing circuit.
Figure 21:
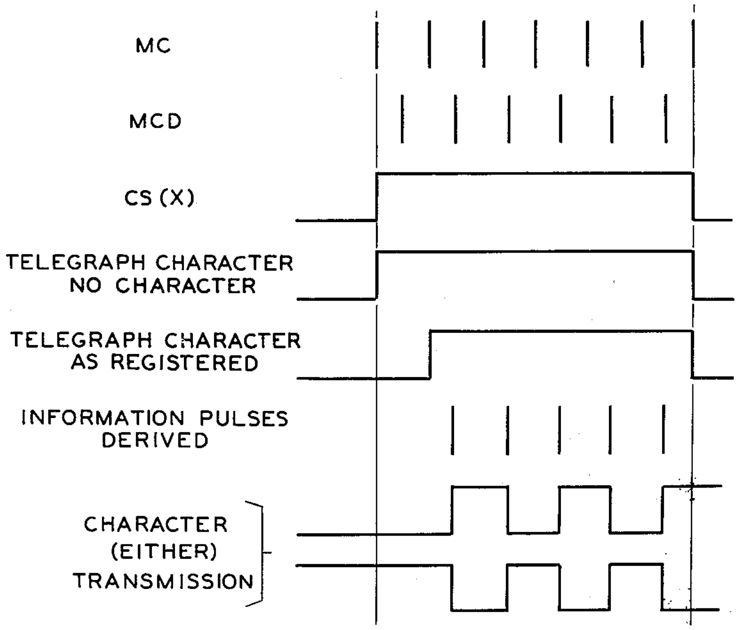
FIG. 21 is a sequence chart by which the operation of the circuit of FIG. 20 may be explained.

It should be noted that the Channel Selector signal used to synthesize the Frame Synchronizing Character is connected to an inhibitor 14 in the No Character circuit FIG. 20 whereby this latter circuit becomes blocked during that CS (synchronizing) period. In all other character transmitting periods this inhibitor is conditioned to pass pulses from the FCR flp-flop. Only one other condition exists, however, in which pulses may be passed through the inhibitor I1 and that is where the CS signal to a specific channel circuit finds No Character registered and ready for transmission. Therefore, for the duration of such a CS(X) period there will be no output from such channel for transmission over the line. As a consequence, the FCR flip-flop is triggered ON by the A–1 pulse in synchronism with the leading edge of the CS(X) signal. Since the inhibitor 14 is normal, the ON condition of the FCR flip-flop is passed to one input of the AND circuit A–5 so that upon the following MC pulse the FNC flip-flop is triggered ON.

Since an MCD pulse had occurred between the A–1 pulse which had triggered FCR ON and the following MC pulse which, as described, had passed through the AND circuit A–5 and since the AND circuit had not been enabled at that time the first of the six MCD pulses within the CS(X) period became a 0 and hence there was no mark output for application to the FDC flip-flop.

The second MCD pulse, however, will be passed by the AND circuit A–6 and hence the output of the ORX OR circuit will be a mark pulse for transmission by FDC. This pulse from ORX will also act to trigger the FCR flip-flop OFF so that no further MC pulses are passed through the AND circuit A–5 to the FNC flip-flop. However, this flip-flop is in the ON state and will remain in this state until the following A–1 pulse which marks the end of this CS(X) period (and the beginning of the next such period). Therefore, the AND circuit A–6 will remain enabled and hence will pass another four MCD pulses. Thus it will be seen that the No Character circuit will synthesize the code 011111 for transmission over the line by the FDC flip-flop.

All legitimate characters, which in printing telegraph code start with a space, herein start with a mark due to the fact that they are recorded in the channel register through an inverter. Therefore upon the occurrence of the A–1 pulse at the beginning of the CS(X) period, the FCR flip-flop is triggered ON and then upon the first MCD pulse within that interval it is triggered OFF. Hence the pattern of marks and spaces of such character is reproduced by the MCD pulses transmitted through the ORX OR circuit, with the first or start pulse inverted.

*The telegraph channel registers*

Each such register consists of two groups of bistable square loop magnetic memory elements commonly known as cores, one being marked asynchronous and being adapted to register the bits of an incoming telegraph code and the other being marked synchronous and being adapted to receive by transfer from the first a completely registered code. The telegraph code comes in at the rate of six bits or one complete code in a period of 100 milliseconds. As each bit comes in it is first registered in the left hand core and then forwarded step by step by the asynchronous serial shift pulse means until the complete code is registered, at which time the invariable binary 1 of a legitimate code (the telegraph start pulse inverted) appearing in the extreme right hand core will transmit a parallel shift pulse to cause the transfer of this registered code from the asynchronous to the synchronous part of the register. This clears the asynchronous register for the receipt and registration within the following 100 milliseconds of the following code.

At some given time within this 100 milliseconds the CS signal lasting for 2 milliseconds will be transmitted into this circuit and will enable the AND circuit 16 whereby the MCD pulses are transmitted into the serial pulse amplifier 17 whereby the bits in the synchronous register are shifted to the right step by step, to the ORX OR circuit for transmission over the line 11. This operation, consisting of the admission of six MCD pulses to the serial shift pulse amplifier, takes two milliseconds so that before the asynchronous register is filled the synchronous register must be cleared.

It will be understood that from a practical standpoint and to provide a margin of safety, the multiplexer must be capable of transmitting characters slightly faster than they come in over the line and the rate at which they are transmitted. This however is an engineering consideration and will not be further discussed at this time.

The point to be noted in connection with this circuit is that the incoming telegraph line 18 is connected to the inverting amplifier 19 and will by inverting the start (space) pulse of the telegraph code first drive the flip-flop FST ON over its input E. The FST flip-flop will then remain ON until the code is completely registered and the parallel shift pulse amplifier has transmitted a pulse over the P–SP lead connected to the F input of the FST flip-flop to drive this flip-flop OFF. Upon the movement of the flip-flop FST to ON, its *a* output transmits a signal constituting the start bit of the incoming telegraph code through the OR1 OR circuit into the asynchronous register and at the same time enables the multivibrator 20 during the time remaining during which the FST flip-flop is ON, that is for the remainder of the 100 milliseconds for the receipt of the incoming telegraph code. The AND circuit 21 acts as a gate, being enabled by the multivibrator 20 once during the receipt of each code place of the incoming telegraph code.

A delay multivibrator 22 will produce a delayed pulse for each pulse transmitted by the multivibrator 20 and these passing through the inhibitor 23 and the OR circuit 24 will produce a serial shift pulse to move the telegraph code bits along.

When the CS signal comes in the inhibitor 23 is operated to refuse to pass a DMV pulse but the AND circuit 25 is enabled so that if such a DMV pulse does occur during the 2 millisecond CS signal, the FM flip-flop will be turned ON. At the end of that particular CS(X) time interval FM will be turned off thereby creating a pulse which will pass through the OR circuit 24 for creating an asynchronous register serial shift pulse.

The purpose of this was to prevent the 6th serial shift pulse from making the final core a "1" during the read out period. If this core were made a "1," the asynchronous information would be transferred into the synchronous register, which at that time is being read out. This serial shift pulse is thereby temporarily held in FM and then released at the end of the CS(X) period.

With this short explanation of the operation of the channel register, it is believed to be clear how the registered code therein may be picked off by the six MCD pulses during the 2 millisecond interval of the CS signal.

FIG. 23 is a timing and sequence chart showing the synthesis of the Frame Synchronizing Character 001111, the No Character 011111 and the transformation of the standard Letters Character (telegraph 011111) into the character 111111 for transmission over the line. This chart also shows the transformation of the character A (telegraph 011000) into the character 111000 and indicates the transformation of the character C (telegraph 001110) into the character 101110.

It may be noted that in this sequence chart that whereas the printing telegraph code for No Character is shown as six mark signals because this in the telegraph line is a continuous mark condition, it is shown in the graph "Registered in Synchronous Core Register" as six spaces. This is because the first code signal coming in over the telegraph line is a mark and not the usual space and hence the FST flip-flop cannot be operated and hence no registration in the asynchronous register will be made.

The net result of the synthesis of these artificial characters in between legitimate characters is to produce a fairly continuous train of mark pulses, each consisting of a transition from 0 to 1 or from 1 to 0 for transmission over the line.

What is claimed is:

1. In a multiplex binary code transmission system, wherein a code is characterized as a legitimate code only if the first bit thereof has a given binary value, a transmission line, a plurality of code registers, a counter for counting and producing an enablement signal for enabling each said register in seriatim, means responsive to the said enablement of a register for shifting the bits of a code registered therein out of said register and into said transmission line, a stand-by circuit having an input connected to said transmission line and an output connected for transmission into said transmission line, said stand-by circuit having means responsive to a first code bit of a legitimate code being shifted out of a said register and into said transmission line for disabling itself to offer no interference with the transmission of said legitimate code into said line, said stand-by circuit having means for otherwise synthesizing bits for the remaining number of code bits in a said code and for transmitting said synthesized bits into said transmission line.

2. In a system for transmitting items of information each coded in binary zero and binary one bits, wherein a code is characterized as a legitimate code only if the first bit thereof has a given binary value, a transmission line, a plurality of code registers, a source of timed pulses, a counter for counting said timed pulses and for producing an enablement signal for enabling each said register in seriatim, means responsive to the said enablement of a register for shifting the bits of a code registered therein out of said register and into said transmission line, a stand-by circuit having an input connected to said transmission line and an output connected for transmission into said transmission line, said stand-by circuit being responsive to said timed pulses for synthesizing and transmitting a first special coded item of information into said transmission line, said stand-by circuit having means responsive to a first code bit of a legitimate code being shifted out of a said register and into said transmission line for disabling said stand-by circuit whereby no interference will be offered to the said transmission of said legitimate code.

3. In a system for transmitting items of information each coded in binary zero and binary one bits, wherein a code is characterized as a legitimate code only if it has a binary one first bit, a transmission line, a plurality of code registers, a source of timed pulses, a counter for counting said timed pulses and for producing an enablement signal for enabling each said register in seriatim, means responsive to the said enablement of a register for shifting the bits of a code registered therein out of said register and into said transmission line, a stand-by circuit having an input connected to said transmission line and an output connected for transmission into said transmission line, said stand-by circuit being responsive to said timed pulses for synthesizing and transmitting a first special coded item of information into said transmission line, said stand-by circuit having means responsive to a binary one first code bit of a legitimate code being shifted out of a said register and into said transmission line for disabling said means for synthesizing said special coded item of information to avoid interference with the transmission of said legitimate code.

4. In a system for transmitting items of information each coded in binary zero and binary one bits, wherein a code is characterized as a legitimate code only if it has a binary one first bit, a transmission line, a plurality of code registers, a source of timed pulses, a counter for counting said timed pulses and for producing an enablement signal for enabling each said register in seriatim, means responsive to the said enablement of a register for shifting the bits of a code registered therein out of said register and into said transmission line, a synthetic code producing circuit among said plurality of registers to which one of said enablement signals is assigned, said circuit being responsive to said assigned enablement signal to produce and to transmit a synthetic code into said transmission line, a stand-by circuit having an input connected to said transmission line and an output connected for transmission into said transmission line, said stand-by circuit being responsive to said timed pulses for synthesizing and transmitting a stand-by coded item of information into said transmission line, said stand-by circuit having means responsive to a binary one first code bit of a legitimate code being shifted out of a said register and into said transmission line for disabling said means for synthesizing said stand-by coded item of information, said stand-by circuit additionally having means responsive to sad enablement signal assigned to said synthetic code producing circuit for disabling said means for synthesizing said stand-by coded item of information to avoid interference with the transmission of either a legitimate code or said code produced by said synthetic code producing circuit.

5. In a system for transmitting items of information each coded in binary zero and binary one bits, wherein a code is characterized as a legitimate code only if it has a binary one first bit, a transmission line, a plurality of code registers, a source of timed pulses, a counter for counting said timed pulses and for producing an enablement signal for enabling each said register in seriatim, means responsive to the said enablement of a register for shifting the bits of a code registered therein out of said register and into said transmission line, a plurality of circuits for synthesizing codes each characteristically different from said codes representing items of information, including a synchronizing code circuit among said plurality of registers and to which one of said enablement signals is assigned, and a stand-by circuit having an input connected to said transmission line and an output connected for transmission into said transmission line, said stand-by circuit being responsive to said timed pulses for synthesizing and transmitting a stand-by coded item of information into said transmission line, said stand-by circuit having means responsive to a binary one first code bit of a legitimate code being shifted out of a said register and into said transmission line for disabling said means for synthesizing said stand-by coded item of information, said stand-by circuit additionally having means responsive to each said enablement signal assigned to other circuits for synthesizing said codes characteristically different from said legitimate codes representing items of information to avoid interference with the transmission of either a legitimate code or a code produced by another synthetic code producing circuit.

6. In a system for transmitting items of information each coded in binary zero and binary one bits, wherein a code is characterized as a legitimate code only if it has a binary one first bit, a transmission line, a plurality of code registers, a source of timed pulses, a counter for recurrently counting $n$ pulses where $n$ represents the number of coded bits stored in each of said code registers, another counter for counting said recurrent counts and for producing an enablement signal for enabling each said register in seriatim, means responsive to the said enablement of a register for shifting the bits of a code registered therein out of said register and into said transmission line, a synthetic code producing circuit among said plurality of registers to which one of said enablement signals is assigned, said circuit being responsive to said assigned enablement signal to produce and to transmit a synthetic code into said transmission line, a stand-by circuit having an input connected to said transmission line and an output connected for transmission into said transmission line, said stand-by circuit being responsive to said first counter for synthesizing during the period of each said enablement signal a stand-by coded item of information and for transmitting said stand-by item of information into said transmission line, said stand-by circuit having means responsive to a binary one first code bit of a legitimate code being shifted out of a said register and into said transmission line for disabling said means for synthesizing said stand-by coded item of information, said stand-by circuit additionally having means responsive to said enablement signal assigned to said synthetic code producing circuit for disabling said means for synthesizing said stand-by coded item of information to avoid interference with the transmission of either a legitimate code or a said code produced by said synthetic code producing circuit.

7. In a system for transmitting items of information each coded in binary zero and binary one bits, wherein a code is characterized as a legitimate code only if it has a binary one first bit, a transmission line, a plurality of code registers each having means to register an $n$ place code, a source of timed pulses, a counter for recurrently counting $n$ pulses and for producing a stepping pulse on each said recurrent count, another counter for counting said stepping pulses and for producing on each said count an enablement signal for enabling each said register in seriatim, means responsive to the said enablement of a register for shifting the bits of a code registered therein out of said register and into said transmission line, a synthetic code producing circuit among said plurality of registers to which one of said enablement signals is assigned, said circuit being responsive to said assigned enablement signal to produce and to transmit a synthetic code into said transmission line, a stand-by circuit having an input connected to said transmission line and an output connected for transmission into said transmission line, said stand-by circuit being responsive to said stepping pulses for synthesizing during the period of each said enablement signal a stand-by coded item of information and for transmitting said stand-by item of information into said transmission line, said stand-by circuit having means responsive to a binary one first code bit of a legitimate code being shifted out of a said register and into said transmission line for disabling said means for synthesizing said stand-by coded item of information, said stand-by circuit additionally having means responsive to said enablement signal assigned to said synthetic code producing circuit for disabling said means for synthesizing said stand-by coded item of information to avoid interference with the transmission of either a legitimate code or a said code produced by said synthetic code producing circuit.

8. In a system for transmitting items of information each coded in binary zero and binary one bits, wherein a code is characterized as a legitimate code only if it has a binary one first bit, a transmission line, a plurality of code registers, a source of timed pulses, a counter for counting said timed pulses and for producing an enablement signal for enabling each said register in seriatim, means responsive to the said enablement of a register for shifting the bits of a code registered therein out of said register and into said transmission line, a synthetic code producing circuit among said plurality of registers to which one of said enablement signals is assigned, said circuit being responsive to said assigned enablement signal to produce and to transmit a synthetic code into said transmission line, a stand-by circuit having an input connected to said transmission line and an output connected for transmission into said transmission line, said stand-by circuit having a starting means invariably responsive to said counting means for starting the operation thereof, said stand-by circuit being responsive to said timed pulses for synthesizing and transmitting a stand-by coded item of information into said transmission line, said stand-by circuit having means responsive to a binary one first code bit of a legitimate code being shifted out of a said register and into said transmission line for restoring said start means for synthesizing said stand-by coded item of information, said stand-by circuit additionally having means responsive to said enablement signal assigned to said synthetic code producing circuit for disabling said means for synthesizing said stand-by coded item of information to avoid interference with the transmission of either a legitimate code or said code produced by said synthetic code producing circuit.

References Cited in the file of this patent

UNITED STATES PATENTS

| | | |
|---|---|---|
| 2,171,542 | Cunningham et al. | Sept. 5, 1939 |
| 2,536,917 | Dickinson | Jan. 2, 1951 |
| 2,609,451 | Hansen | Sept. 2, 1952 |
| 2,623,171 | Woods-Hill et al. | Dec. 23, 1952 |
| 2,671,132 | Shenkn et al. | Mar. 2, 1954 |
| 2,805,279 | Walker et al. | Sept. 3, 1957 |